(No Model.) 2 Sheets—Sheet 1.
C. W. JEFFERSON.
MOLDING MICA FORMS FOR ELECTRICAL INSULATORS.
No. 483,653. Patented Oct. 4, 1892.
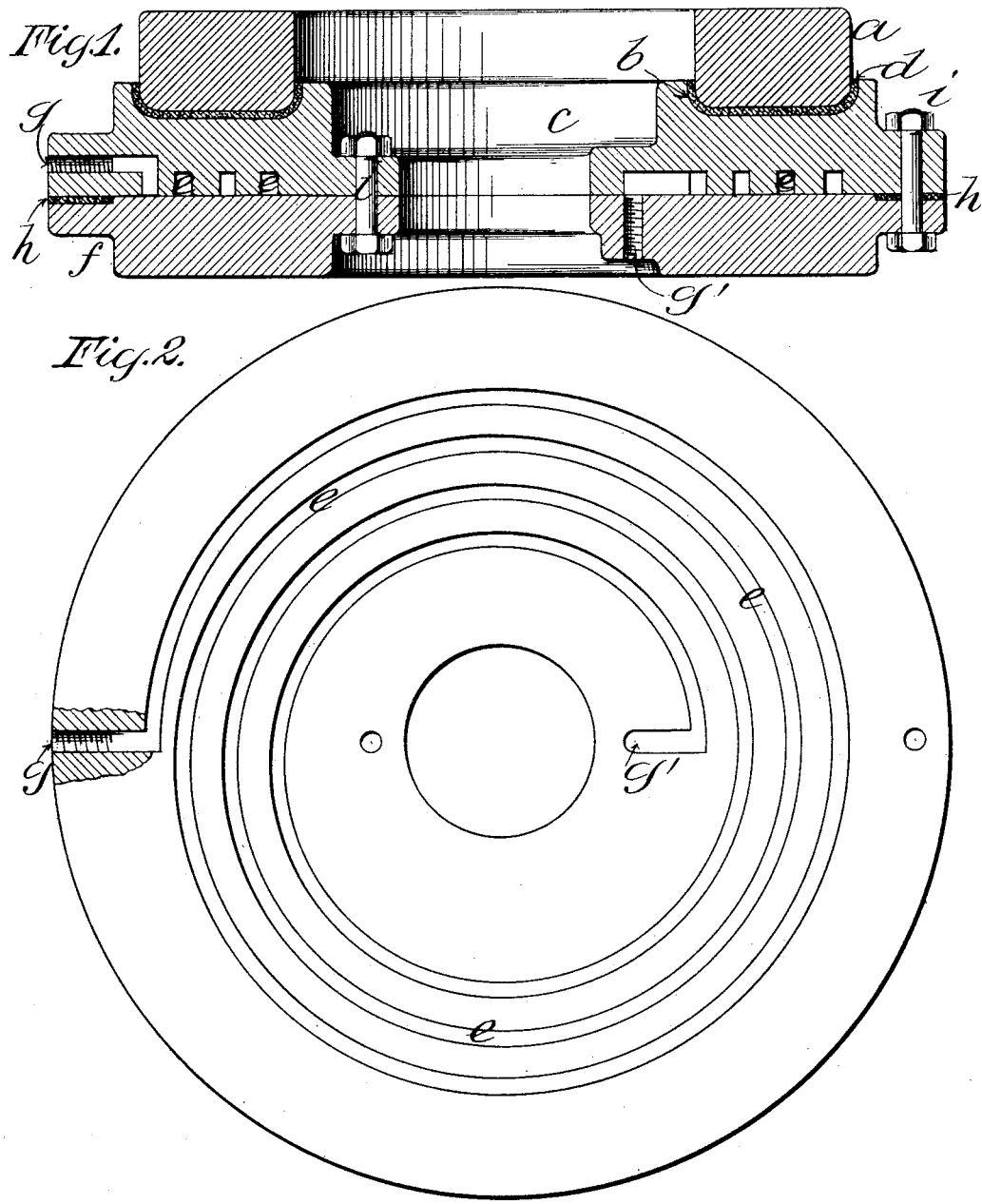

(No Model.) 2 Sheets—Sheet 2.
C. W. JEFFERSON.
MOLDING MICA FORMS FOR ELECTRICAL INSULATORS.
No. 483,653. Patented Oct. 4, 1892.
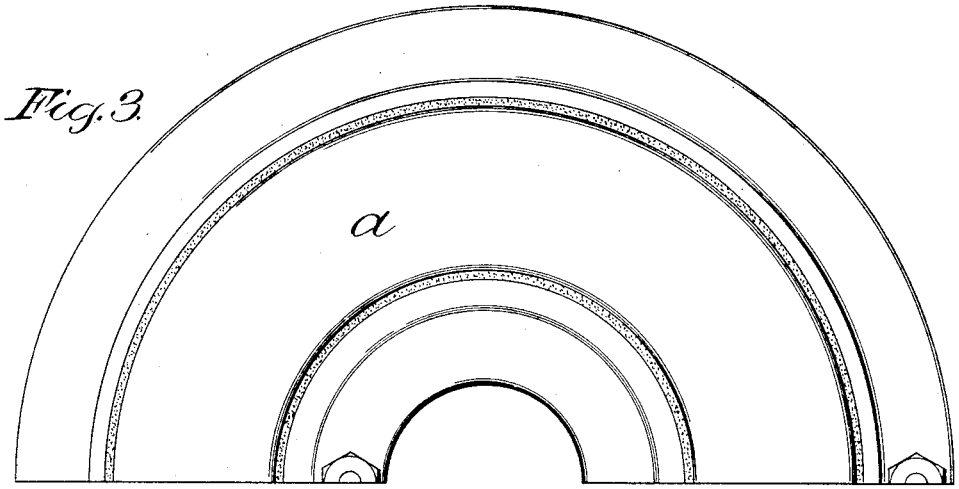
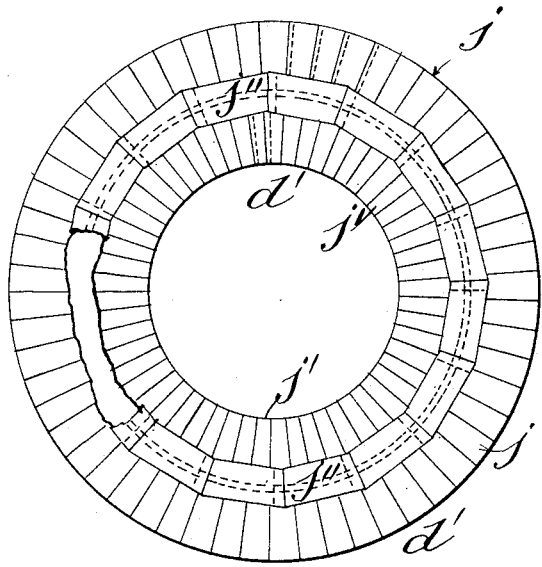
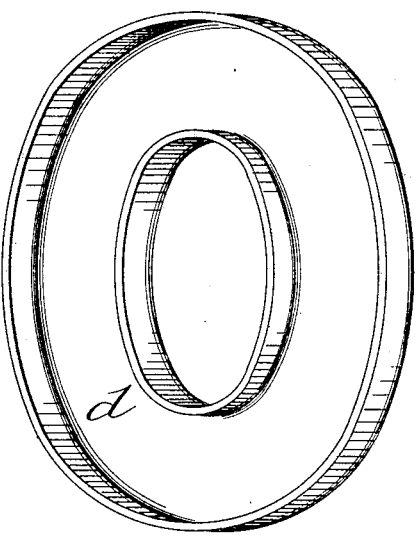

UNITED STATES PATENT OFFICE.

CHARLES W. JEFFERSON, OF SCHENECTADY, ASSIGNOR TO EUGENE MUNSELL & CO., OF NEW YORK, N. Y.

MOLDING MICA FORMS FOR ELECTRICAL INSULATORS.

SPECIFICATION forming part of Letters Patent No. 483,653, dated October 4, 1892.

Application filed June 1, 1892. Serial No. 435,170. (No model.)

*To all whom it may concern:*

Be it known that I, CHARLES W. JEFFERSON, a subject of the Queen of Great Britain, and a resident of Schenectady, in the county of Schenectady and State of New York, have invented certain new and useful Improvements in Molding Mica Forms for Electrical Insulators, of which the following is a specification.

My invention relates to a device especially adapted for molding the mica flanged rings for Gramme-ring armatures.

Those elements described but not claimed in this application are claimed in previous applications of my colleague, Arthur H. S. Dyer, Serial Nos. 435,216 and 435,217, filed on the 1st day of June, 1892, and my application, Serial No. 433,820, filed on the 21st day of May, 1892.

The accompanying drawings set forth the construction of the mold.

Figure 1 is a vertical central section of the mold, in which is seen the molded mica flanged ring, also in section. Fig. 2 is an inverted plan view of upper half of the mold, all other elements being omitted. Fig. 3 is a plan of the half of the device shown in Fig. 1. Fig. 4 shows a plan of one layer of the built-up mica annular disk, which by means of the mold becomes transformed into the flanged ring shown in perspective in Fig. 5.

The device embodying my invention consists of the combination of a core $a$ in the form of a ring having rounded edges, where it fits into a corresponding groove $b$ in the upper part of the ring $c$. In this groove and between the core $a$ and molding-ring $c$ is the mica flanged ring $d$, compressed from the annular disk $d'$. The under surface of the ring $c$ is flat, except for the spiral groove $e$, and fits upon the annular plate $f$ in such a manner that the groove $e$ becomes a conduit, having an entrance at $g$ and exit at $g'$. A gasket $h$ is placed between the plate $f$ and ring $c$, and all are clamped together by bolts $i$. It is evident that the conduit $e$ may be used for the passage of hot or cold fluids—as, for example, cold water or steam.

The operation consists in placing the disk $d'$ in the groove $b$ of the ring $c$, and applying the core $a$ under pressure. In order that the result of the operation may be successful, the following preliminaries should be known: The disk $d'$ is built up of a series of mica scales $j$, forming one ring and overlapping one another, and a second series of mica scales $j'$, arranged in a smaller circle and overlapping one another, the scales in each ring being short strips radiating from the center of the annular disk. Joining the two rings formed of the strips $j\ j'$ are overlapping strips $j''$, overlapping at their ends and overlapping the ends of the strips $j\ j'$. The dotted lines indicate the overlapping joints. All the pieces are held to one another by a cement, preferably copal varnish or shellac. While the cement is still soft the disk is placed in the groove $b$ and pressure applied. When the sheet or disk $d'$ is bent over by the former or core $a$, the individual scales of mica, of which the disk is composed, slide upon one another and do not buckle up, as when a sheet of a single piece is employed. Heating the mold by the passage of the hot water or steam through the conduit $e$ dries out the solvent of the cement, which is still wet when the disk $d'$ is first put into the mold. Soon cold water is passed through the conduit $e$ to set the mica. The chilling by this means causes the flanged ring $d$ to have a permanent set. This ring $d$ may be employed in the Gramme-ring armature for the purposes of insulation. In practice several layers of disks $d'$ are superposed and cemented together and molded while green or wet and then chilled, thereby forming thick and strong insulating flanged rings.

I claim as my invention—

1. A mold for forming and setting laminated mica sheets, consisting of an annular plate $f$, an annular plate $c$, having a spiral groove extending from its outer to its inner periphery clamped to the plate $f$ in such relative positions that the groove becomes a conduit, closed except at the ends and having a curved groove $b$ for containing the laminated and cemented mica scales, a core $a$, fitting in the groove $b$, and means for preventing leakage, consisting of a gasket at and between the outer peripheries of the rings $c$ and $f$.

2. The hereinbefore-described process of bending and setting mica sheets, consisting in building a mica sheet by cementing together laminæ of mica scales with overlapping edges, compressing the sheet into the desired form while the cement is wet, drying the cement by evaporating the solvent thereof, and finally chilling the molded mica sheet while under compression.

In testimony that I claim the foregoing as my invention I have signed my name, in presence of two witnesses, this 28th day of May, 1892.

CHARLES W. JEFFERSON.

Witnesses:
A. H. JACKSON,
S. W. JACKSON.